(12) United States Patent
Que et al.

(10) Patent No.: US 11,868,333 B2
(45) Date of Patent: Jan. 9, 2024

(54) DATA READ/WRITE METHOD AND APPARATUS FOR DATABASE

(71) Applicant: Huawei Technologies Co., Ltd., Shenzhen (CN)

(72) Inventors: Mingjian Que, Hangzhou (CN); Chuanting Wang, Beijing (CN); Junjie Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/837,496

(22) Filed: Jun. 10, 2022

(65) Prior Publication Data
US 2022/0300477 A1    Sep. 22, 2022

Related U.S. Application Data

(63) Continuation of application No. PCT/CN2020/120216, filed on Oct. 10, 2020.

(30) Foreign Application Priority Data

Dec. 13, 2019  (CN) .......................... 201911282832.6
Jan. 23, 2020  (CN) .......................... 202010077018.7

(51) Int. Cl.
G06F 15/16    (2006.01)
G06F 16/22    (2019.01)
G06F 16/27    (2019.01)
G06F 16/2455  (2019.01)
G06F 9/50     (2006.01)

(52) U.S. Cl.
CPC ........ G06F 16/2282 (2019.01); G06F 9/5088 (2013.01); G06F 16/24552 (2019.01); G06F 16/27 (2019.01)

(58) Field of Classification Search
None
See application file for complete search history.

(56) References Cited

U.S. PATENT DOCUMENTS

| | | | |
|---|---|---|---|
| 5,758,345 A | 5/1998 | Wang | |
| 6,272,491 B1 | 8/2001 | Han et al. | |
| 7,665,089 B1 * | 2/2010 | Vengerov | G06F 9/4881 711/151 |
| 2003/0177443 A1 * | 9/2003 | Schnelle | G06F 16/86 715/239 |

(Continued)

FOREIGN PATENT DOCUMENTS

| | | |
|---|---|---|
| CN | 102831223 A | 12/2012 |
| CN | 104185841 A | 12/2014 |

(Continued)

*Primary Examiner* — Alex Gofman
(74) *Attorney, Agent, or Firm* — Conley Rose, P.C.

(57) ABSTRACT

A data read/write method includes: establishing a first connection to a client, determining a first tablespace corresponding to the first connection, and determining a first node corresponding to the first connection or the first tablespace in a plurality of nodes, where the first connection receives a read/write request from the client; loading data in the first tablespace to a memory in the first node, and processing a read/write request on the first connection using a first working thread, where the first working thread is generated by a processor in the first node.

20 Claims, 12 Drawing Sheets

(56) References Cited

U.S. PATENT DOCUMENTS

| | | | |
|---|---|---|---|
| 2011/0153576 A1* | 6/2011 | Figus | ............... G06F 16/284 707/E17.058 |
| 2014/0279902 A1 | 9/2014 | Hattori | |
| 2015/0052214 A1 | 2/2015 | Zhao et al. | |
| 2017/0116266 A1 | 4/2017 | Lahorani et al. | |
| 2017/0177698 A1 | 6/2017 | Lee et al. | |
| 2017/0220432 A1 | 8/2017 | Misra et al. | |
| 2017/0295223 A1 | 10/2017 | Prasad et al. | |
| 2022/0300477 A1 | 9/2022 | Que et al. | |

FOREIGN PATENT DOCUMENTS

| | | |
|---|---|---|
| CN | 105260376 A | 1/2016 |
| CN | 105354319 A | 2/2016 |
| CN | 106060004 A | 10/2016 |
| CN | 106339432 A | 1/2017 |
| CN | 106484311 A | 3/2017 |
| CN | 106815251 A | 6/2017 |
| CN | 107016039 A | 8/2017 |
| CN | 107229635 A | 10/2017 |
| CN | 109241193 A | 1/2019 |
| CN | 109460426 A | 3/2019 |
| CN | 109889561 A | 6/2019 |
| CN | 110300188 A | 10/2019 |
| CN | 110471977 A | 11/2019 |
| CN | 111309805 A | 6/2020 |
| EP | 2954424 B1 | 5/2018 |

* cited by examiner

DATA READ/WRITE METHOD AND APPARATUS FOR DATABASE

CROSS-REFERENCE TO RELATED APPLICATIONS

This is a U.S. continuation of International Patent Application No. PCT/CN2020/120216 filed on Oct. 10, 2020, which claims priority to Chinese Patent Application No. 202010077018.7 filed on Jan. 23, 2020 and Chinese Patent Application No. 201911282832.6 filed on Dec. 13, 2019. All of which are hereby incorporated by reference in their entireties.

TECHNICAL FIELD

This disclosure relates to the field of data read/write technologies, and in particular, to a data read/write method and apparatus for a database.

BACKGROUND

A computer apparatus is a data read/write apparatus, and can support a read/write operation on data. The computer apparatus usually includes a processor, a memory, and an external memory, and data that is read/written is usually data in the external memory. When the computer apparatus receives a read/write request for data in the external memory, the computer apparatus needs to process the read/write request by using a working thread in the processor. For example, the working thread loads the data from the external memory to the memory for reading/writing.

With development of science and technology, a computer apparatus including a plurality of processors is widely applied. The computer apparatus may be divided into a plurality of nodes based on the plurality of processors, and each node includes one processor and a part of a memory. In this scenario, the computer apparatus may process a read/write request by using a working thread in a processor in any node. In addition, the working thread may load data corresponding to the read/write request to a memory in any node for reading/writing.

However, when the computer apparatus is divided into the plurality of nodes, a working thread in a node often loads data to a memory outside the node. Consequently, a processor performs cross-node data reading/writing. Because efficiency of the cross-node data reading/writing is low, when the computer apparatus is divided into the plurality of nodes, it is difficult to ensure high data read/write efficiency.

SUMMARY

This disclosure provides a data read/write method and apparatus for a database, to resolve a problem of low data read/write efficiency. The technical solutions are as follows.

According to a first aspect, a data read/write method for a database is provided. The method is performed by a computer apparatus, the computer apparatus includes a plurality of nodes, and each of the plurality of nodes includes a processor and a memory. The method includes establishing a first connection to a client, where the first connection is used to transmit a read/write request sent by the client, determining a first tablespace corresponding to the first connection, and determining a first node corresponding to the first connection or the first tablespace in the plurality of nodes, where the first connection receives a read/write request sent by the client, and then loading data in the first tablespace to a memory in the first node, and processing a read/write request on the first connection by using a first working thread, where the first working thread is generated by a processor in the first node.

In the data read/write method provided in embodiments of this disclosure, there is a high probability that the read/write request sent by the client through the first connection accesses the first tablespace. After the computer apparatus establishes the first connection to the client, there is a high probability that each tablespace that the client needs to access is the first tablespace. Therefore, if data in a tablespace that is to be accessed by the read/write request on the first connection is loaded to the first node, and the read/write request loaded to the first node is read/written by using the first working thread in the first node, there is a high probability that cross-node data reading/writing can be avoided.

According to the first aspect, in a possible implementation of this disclosure, determining a first tablespace corresponding to the first connection includes responding to the read/write request on the first connection by using an initial working thread, determining a tablespace accessed for responding to the read/write request on the first connection by using the initial working thread, and determining, based on the tablespace accessed for responding to the read/write request on the first connection by using the initial working thread, the first tablespace corresponding to the first connection. The initial working thread is run on any one of the plurality of nodes. It can be learned that, according to the data read/write method provided in this disclosure, the first tablespace corresponding to the first connection may be determined based on the tablespace accessed for responding to the read/write request on the first connection by using the initial working thread, so that the first tablespace is closely associated with the tablespace accessed by the read/write request on the first connection.

According to the first aspect, in another possible implementation of this disclosure, determining, based on the tablespace accessed for responding to the read/write request on the first connection by using the initial working thread, the first tablespace corresponding to the first connection includes determining, as the first tablespace, a tablespace that is the first to be accessed in a process of responding to the read/write request on the first connection by using the initial working thread, or determining, as the first tablespace, a tablespace that is most frequently accessed within predetermined duration in a process of responding to the read/write request on the first connection by using the initial working thread.

In one aspect, when the computer apparatus determines the tablespace that is the first to be accessed as the first tablespace, in the process of responding to the read/write request on the first connection by using the initial working thread, the computer apparatus only needs to detect the tablespace that is the first to be accessed by the read/write request on the first connection. Therefore, efficiency of determining the first tablespace by the computer apparatus is high. In another aspect, when the computer apparatus determines the tablespace that is most frequently accessed as the first tablespace, the computer apparatus determines the first tablespace based on a history of a plurality of accesses to tablespaces by using the initial working thread. Therefore, the determined first tablespace is a tablespace that needs to be probably accessed by the read/write request on the first connection.

According to the first aspect, in another possible implementation of this disclosure, before the processing a read/ write request on the first connection by using a first working thread, the method further includes determining that the initial working thread is located in a node other than the first node, and migrating the initial working thread to the first node, where the initial working thread after the migration is the first working thread. The initial working thread is migrated, so that working threads that process the read/write request on the first connection before and after the first tablespace is determined are consistent, to facilitate working thread management. When a node in which the initial working thread is located is the first node, the computer apparatus may determine the initial working thread as the first working thread, and does not need to migrate the initial working thread.

According to the first aspect, in another possible implementation of this disclosure, determining a first node corresponding to the first connection or the first tablespace in the plurality of nodes includes determining the first node based on a feature of the first connection, where the feature of the first connection includes an Internet Protocol (IP) address of the client, a name of a user who uses the client, or a name of an application corresponding to the first connection. It can be learned that nodes determined based on connections having a same feature are all the first node. This ensures that tablespaces that need to be accessed by read/write requests on the connections having the same feature can be loaded to a same node as much as possible, to facilitate subsequent reading/writing of data in the tablespaces.

According to the first aspect, in another possible implementation of this disclosure, before establishing a first connection to a client, the method further includes creating the first tablespace, where the first tablespace carries a first identifier, and the first identifier indicates the first node. In this case, determining a first node corresponding to the first connection or the first tablespace in the plurality of nodes includes determining the first node based on the first identifier carried in the first tablespace. When the created first tablespace carries the first identifier, the first node may be directly determined based on the first identifier carried in the first tablespace, so that efficiency of determining the first node is high.

According to the first aspect, in another possible implementation of this disclosure, an identifier carried in a tablespace may also be an identifier of a buffer in a node corresponding to the tablespace. It can be considered that there is a correspondence between a tablespace and a buffer in the node. Optionally, data in a tablespace may be loaded to a corresponding buffer. Certainly, the data in the tablespace may not be loaded to the corresponding buffer. This is not limited in embodiments of this disclosure. When an identifier carried in a tablespace is an identifier of a buffer, the computer apparatus may first determine a first buffer corresponding to the first tablespace or the first connection, and then determine a node in which the first buffer is located as the first node corresponding to the first connection or the first tablespace. Data in a tablespace is loaded to a buffer in a node, so that the computer apparatus can effectively manage the data loaded to the node.

According to the first aspect, in another possible implementation of this disclosure, the computer apparatus includes a first thread pool and a second thread pool. A working thread in the first thread pool is used to process a read/write request on a connection carrying the first identifier, and a working thread in the second thread pool is used to process a read/write request on a connection that does not carry an identifier. After determining a first node corresponding to the first connection or the first tablespace in the plurality of nodes, the method further includes enabling the first connection to carry the first identifier. Then, because the first connection carries the first identifier indicating the first node, the computer apparatus may select an idle working thread from the first thread pool of the first node as the first working thread, and respond to the read/write request on the first connection by using the first working thread. Before the computer apparatus needs to respond to the read/write request on the first connection by using the initial working thread, because the initial working thread does not carry an identifier indicating any node, the computer apparatus may select an idle thread from the second thread pool as the initial working thread, and respond to the read/write request on the first connection by using the initial working thread. In a thread pool mode, when the computer apparatus responds to a read/write request on a connection by using a working thread, there needs to be an idle working thread in a corresponding thread pool, so that the computer apparatus can sequentially process read/write requests on a plurality of connections.

According to the first aspect, in another possible implementation of this disclosure, the computer apparatus may further detect whether a quantity of working threads that access the first tablespace in target duration is less than a first quantity threshold. If the quantity of working threads that access the first tablespace in the target duration is less than the first quantity threshold, the computer apparatus may migrate all data in the first tablespace to a second tablespace. The second tablespace may be any tablespace other than the first tablespace. Optionally, a quantity of working threads that access the second tablespace in the target duration may be greater than or equal to the first quantity threshold. In this way, the computer apparatus migrates the data in the first tablespace that is less frequently accessed to the second tablespace that is more frequently accessed, to avoid a tablespace that is less frequently accessed.

According to the first aspect, in another possible implementation of this disclosure, the computer apparatus may further detect whether the quantity of working threads that access the first tablespace in the target duration is greater than a second quantity threshold. The second quantity threshold may be greater than the first quantity threshold. If the quantity of working threads that access the first tablespace in the target duration is greater than the second quantity threshold, the computer apparatus may migrate at least a part of the data in the first tablespace to a third tablespace. The third tablespace may be any tablespace other than the first tablespace. Optionally, a quantity of working threads that access the third tablespace in the target duration may be less than or equal to the second quantity threshold. In this way, the computer apparatus migrates at least the part of the data in the first tablespace that is more frequently accessed to the third tablespace that is less frequently accessed, so that the first tablespace is less frequently accessed.

According to the first aspect, in another possible implementation of this disclosure, the computer apparatus may further detect loads of a plurality of nodes. When determining that a load of the first node is higher than a first load threshold and a load of a second node is lower than a second load threshold, the computer apparatus may migrate data in a part of tablespaces corresponding to the first node to the second node, and modify correspondences between the migrated tablespaces and nodes, to implement load balancing between nodes.

According to a second aspect, a data read/write apparatus for a database is provided. The data read/write apparatus for a database includes modules configured to perform any data read/write method provided in the first aspect.

According to a third aspect, a computer apparatus is provided. The computer apparatus includes a processor and a memory, the memory stores a program, and the processor is configured to invoke the program stored in the memory, so that the computer apparatus performs any data read/write method for a database provided in the first aspect.

According to a fourth aspect, a computer storage medium is provided. The storage medium stores a computer program, and when the computer program is run on a computer apparatus, the computer apparatus is enabled to perform any data read/write method for a database provided in the first aspect.

DESCRIPTION OF EMBODIMENTS

To make the principle, technical solutions, and advantages of this disclosure clearer, the following further describes implementations of this disclosure in detail with reference to the accompanying drawings.

Figure 1:
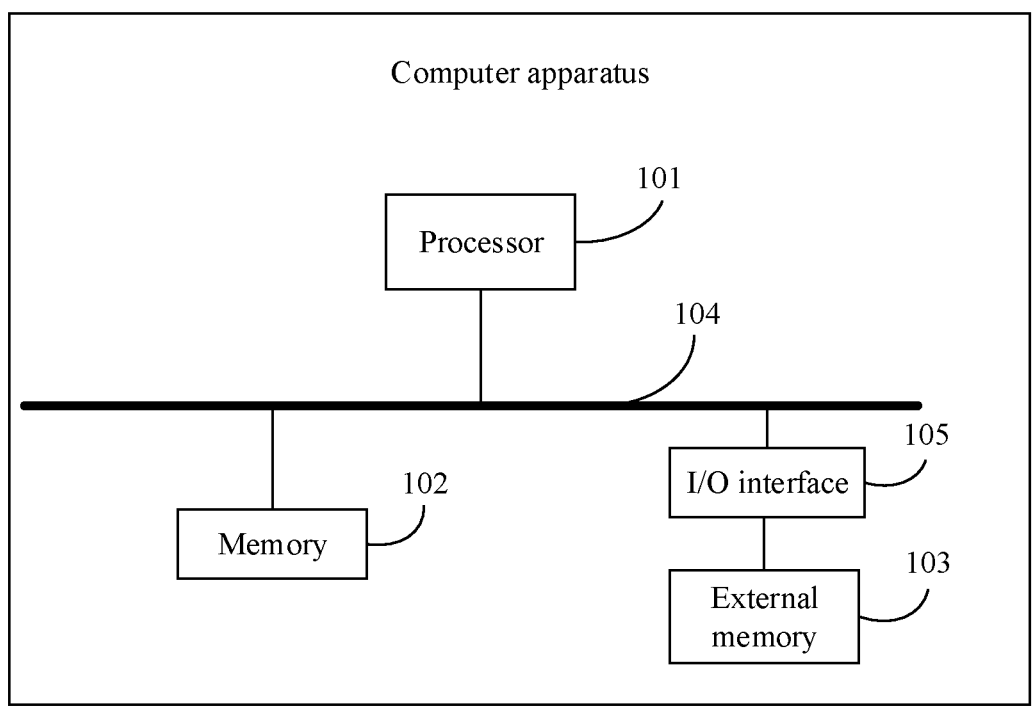
FIG. 1 is a schematic diagram of a structure of a computer apparatus according to an embodiment of this disclosure.

FIG. 1 is a schematic diagram of a structure of a computer apparatus according to an embodiment of this disclosure. The computer apparatus 01 may be any device having a data read/write function, such as a server or a computer. As shown in FIG. 1, the computer apparatus 01 usually includes a processor 101, a memory 102, an external memory 103, a bus 104, and an input/output (I/O) interface 105. The processor 101, the memory 102, and the I/O interface 105 are communicatively connected through the bus 104, and the I/O interface 105 is further connected to the external memory 103. The processor 101 can invoke, through the bus 104, data stored in the memory 102.

Both the memory 102 and the external memory 103 may be structures that are used to store data in the computer apparatus 01. The memory 102 is also referred to as an internal memory or a main memory, and is configured to temporarily store operation data from the processor and data exchanged with the external memory. The external memory 103 is also referred to as a secondary memory, and is configured to permanently store data. The external memory 103 may be a hard disk, a floppy disk, a compact disc (CD), a Universal Serial Bus (USB) flash drive, or the like. The processor 101 can directly access the memory 102, but cannot directly access the external memory 103. When the processor 101 needs to access data in the external memory 103, the processor 101 usually needs to first load the data in the external memory 103 to the memory 102 through the I/O interface 105 and the bus 104, and then the processor 101 can access the data loaded to the memory 102. In addition, a data storage speed of the memory 102 is faster than a data storage speed of the external memory 103, but a capacity of the memory 102 is usually far less than a capacity of the external memory 103. Data stored in the memory 102 usually cannot be stored after the computer apparatus 01 is powered off, and data stored in the external memory 103 can still be stored after the computer apparatus 01 is powered off.

The computer apparatus may manage data in the external memory by using a database. The database may be any database, for example, a disk resident database or an in-memory database. This is not limited in embodiments of this disclosure. Certainly, the computer apparatus may alternatively not manage the data in the external memory by using the database. This is not limited in embodiments of this disclosure.

For example, the database may include a plurality of tablespaces, the tablespaces correspond to a part of storage spaces in the external storage, and different tablespaces correspond to different storage spaces. The tablespace is a logical storage concept. Data in a tablespace is actually stored in a storage space corresponding to the tablespace. Reading/writing data in each tablespace is equivalent to reading/writing data in a storage space corresponding to the tablespace in the external storage.

Data stored in the database may be referred to as table data. The table data may include at least one page. It may be understood that the table data may be divided into at least one page. The table data can be obtained by splicing the at least one page. For example, the table data may record names, ages, and genders of students in a class. If the students in the class are divided into four groups, the table data may include four pages that one-to-one correspond to the four groups of students, and each page may include names, ages, and genders of a corresponding group of students. Alternatively, the table data may include two pages. One page includes the names and the ages of the students in the class, and the other page includes the names and the genders of the students in the class. A relationship between table data and a page may alternatively be another relationship. Details are not described herein in embodiments of this disclosure.

Each tablespace in the database may correspond to at least one service, and the tablespace is used to store data of the corresponding service. Services corresponding to the tablespaces may be the same or may be different. This is not limited in embodiments of this disclosure.

In the database, a storage area in the memory of the computer apparatus may also be referred to as a buffer. In a process in which the computer apparatus reads/writes data in a tablespace, the processor 101 needs to first load the data from the external memory to a buffer of the memory 102 by using a working thread in the processor 101, and then read/write the data loaded to the buffer of the memory 102. The buffer in embodiments of this disclosure may be a global buffer in the memory, for example, a global buffer managed by a system global area (SGA): a global data page buffer (data buffer), a global log buffer (log buffer), global execution plan cache (Structured Query Language (SQL) cache), a global sorting/materialization buffer (sort area), or a global data dictionary (metadata) cache (dictionary cache).

Figure 2:
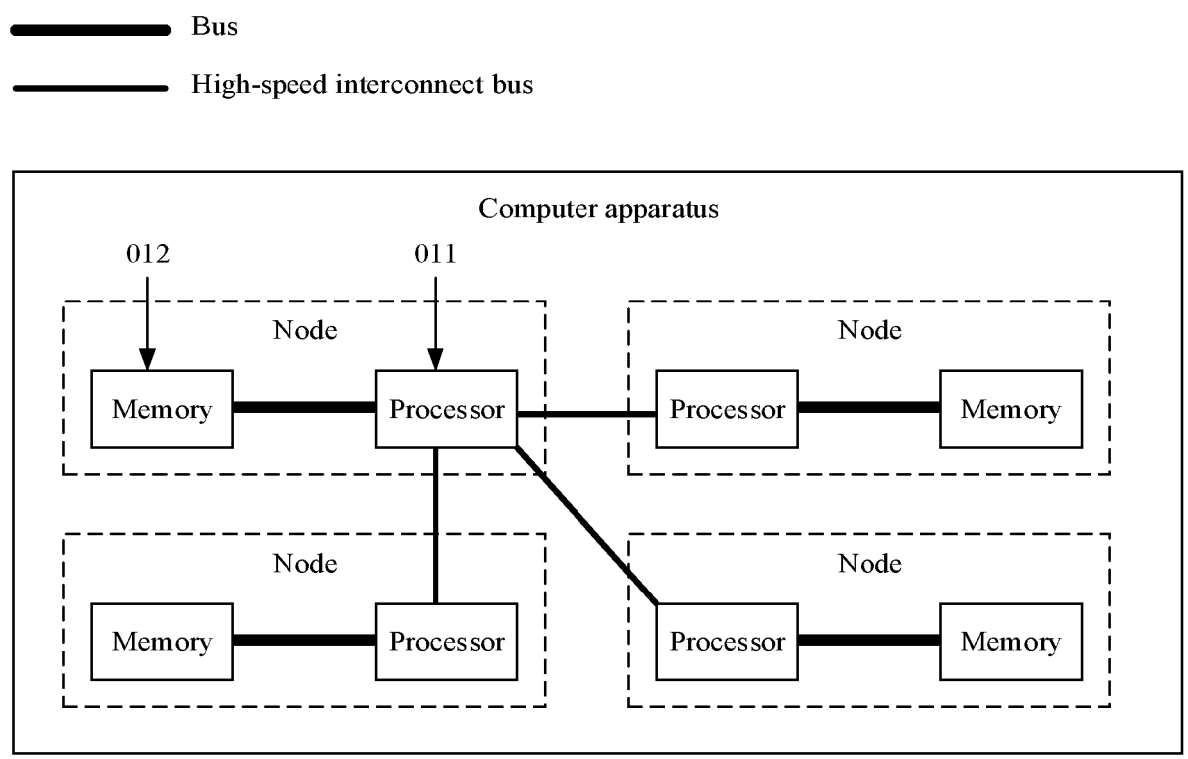
FIG. 2 is a schematic diagram of a structure of another computer apparatus according to an embodiment of this disclosure.

The computer apparatus 01 shown in FIG. 1 includes only one processor 101 and one memory 102. Further, FIG. 2 is a schematic diagram of a structure of another computer apparatus according to an embodiment of this disclosure. As shown in FIG. 2, based on FIG. 1, the computer apparatus may further include a plurality of processors 011 and a plurality of memories 012. In addition, the plurality of processors 011 and the plurality of memories 012 form a plurality of nodes, and each node includes one processor 101 and one memory 102.

The node may also be referred to as a non-uniform memory access (NUMA) node. The processor 101 and the memory 102 in each node are connected through a bus, and the processors in the nodes are connected to each other through a high-speed interconnect bus (for example, the INTEL QuickPath Interconnect (QPI) bus). In addition, a transmission rate of the high-speed interconnect bus is lower than a transmission rate of the bus connecting the processor and the memory in the node. It should be noted that FIG. 2 shows only a connection relationship between a processor of a node and a processor of another node.

The processor 101 in each node in FIG. 2 may read/write data in the external memory. In a related technology, the computer apparatus may load, by using a working thread in a processor in any node, data in a tablespace to a memory 102 of the node, or may load data in a tablespace to a memory 102 of another node. After the computer apparatus loads data in a tablespace to a memory 102 of another node by using a working thread of a processor 101 of a node, the processor 101 reads and writes, by using a working thread of the processor 101, the data loaded to the memory 102 of the other node. This leads to cross-node data reading/writing.

When cross-node data reading/writing is performed, data needs to be read/written through a large quantity of buses, and a data transmission rate of a connection line (for example, the foregoing high-speed interconnect bus) between nodes is low. Consequently, efficiency of cross-node data reading/writing is low, and it is difficult to ensure high data read/write efficiency.

Embodiments of this disclosure provide a data read/write method for a database, to reduce a probability of cross-node data reading/writing and improve data read/write efficiency.

Figure 3:
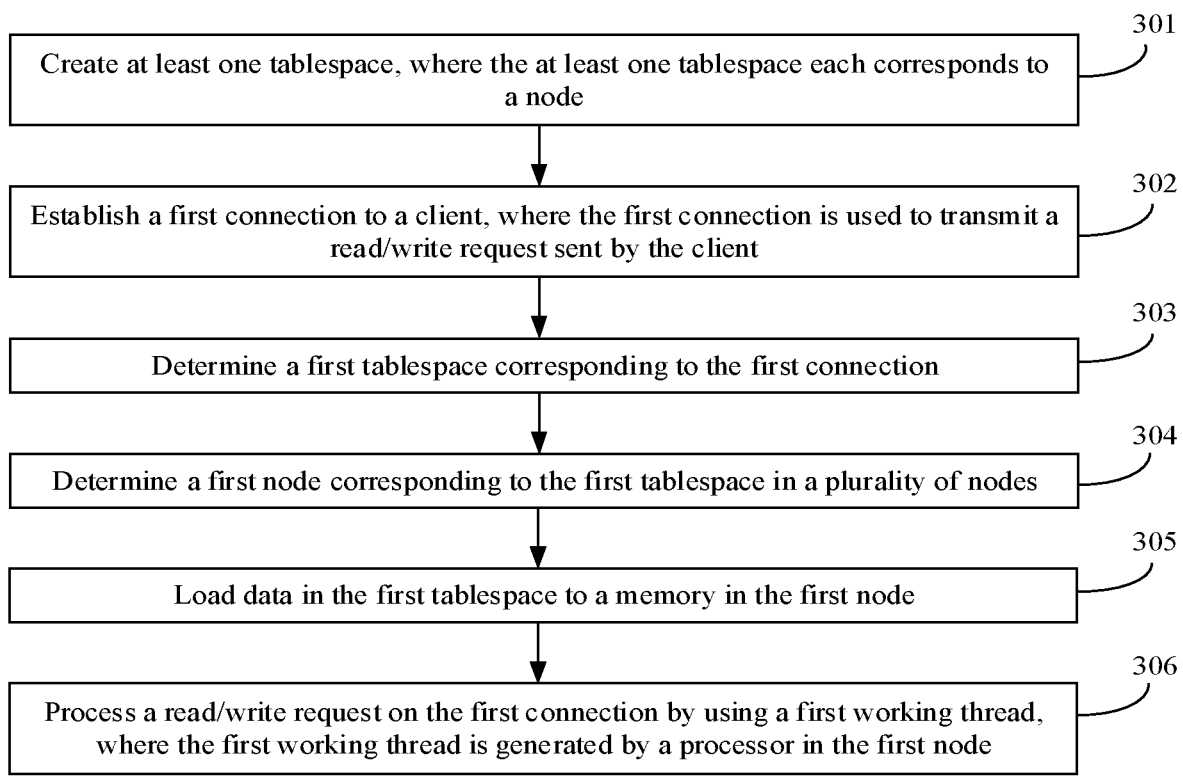
FIG. 3 is a flowchart of a data read/write method for a database according to an embodiment of this disclosure.

For example, FIG. 3 is a flowchart of a data read/write method for a database according to an embodiment of this disclosure. The data read/write method may be performed by the computer apparatus shown in FIG. 2. As shown in FIG. 3, the data read/write method may include the following steps.

Step 301: Create at least one tablespace, where the at least one tablespace each corresponds to a node.

For example, the computer apparatus may create the tablespace based on a tablespace creation instruction. The tablespace creation instruction needs to carry a file corresponding to the tablespace in an external memory, so that data subsequently written in the tablespace may be stored in the file corresponding to the tablespace.

Figure 4:
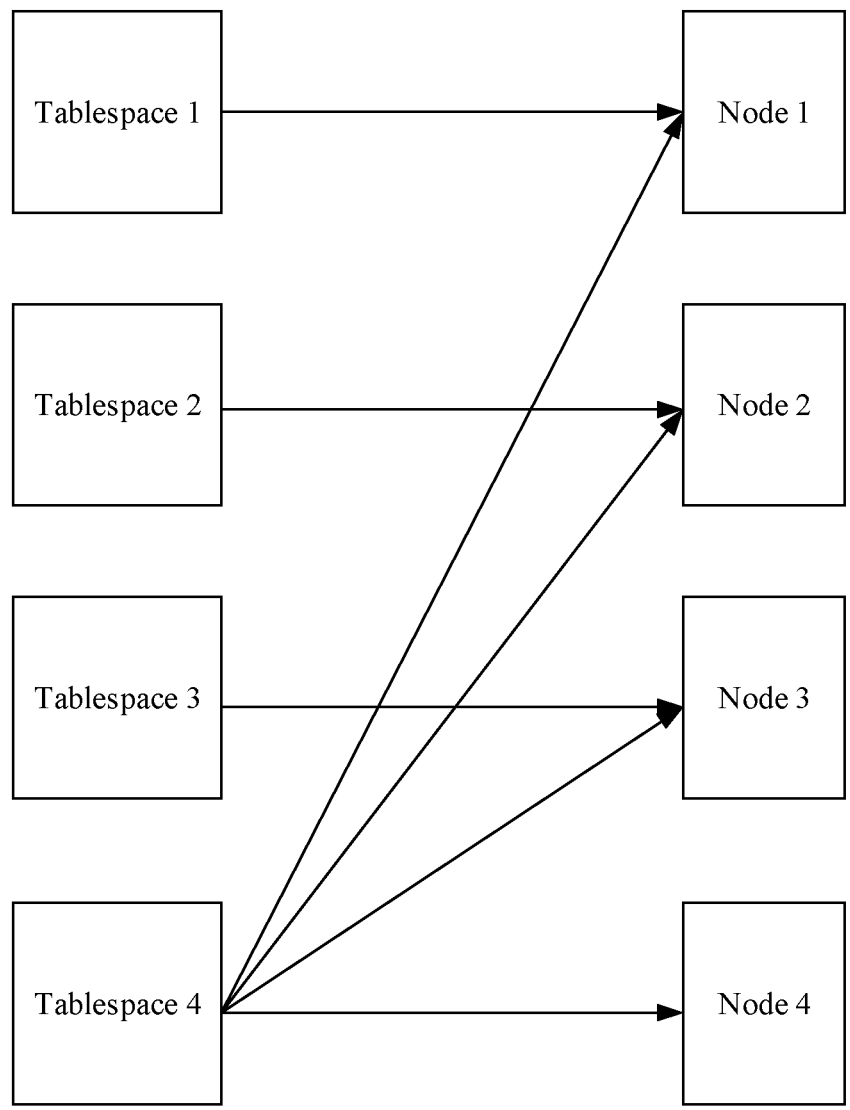
FIG. 4 is a schematic diagram of a correspondence between tablespaces and nodes according to an embodiment of this disclosure.

In a possible implementation of this disclosure, each tablespace corresponds to a service, and the tablespace is used to store only data of the corresponding service. For example, an enterprise can create a tablespace for each employee. The tablespace of each employee is used to store data processed by the employee. This can be considered as a service corresponding to the tablespace is to store the data processed by the employee. The computer apparatus may select, based on a service corresponding to the tablespace, a node from the computer apparatus as a node corresponding to the tablespace. For example, the computer apparatus may select, based on a feature of the service corresponding to the tablespace, a node corresponding to the tablespace from the computer apparatus in a hash, round-robin, or another manner. In this way, tablespaces corresponding to a same service correspond to a same node. For example, as shown in FIG. 4, it is assumed that a tablespace 1 corresponds to a service 1, a tablespace 2 corresponds to a service 2, and a tablespace 3 corresponds to a service 3. The computer apparatus may select, based on a feature of the service 1, a node 1 as a node corresponding to the tablespace 1, select, based on a feature of the service 2, a node 2 as a node corresponding to the tablespace 2, and select, based on a feature of the service 3, a node 3 as a node corresponding to the tablespace 3. Optionally, the computer apparatus may select the node corresponding to the tablespace from the computer apparatus without using the feature of the service corresponding to the tablespace. For example, the computer apparatus may randomly select a node corresponding to the tablespace from the computer apparatus. This is not limited in this embodiment of this disclosure.

The tablespace created by the computer apparatus may carry an identifier, and the identifier indicates the node corresponding to the tablespace. Correspondingly, the tablespace creation instruction also needs to carry an identifier. For example, the tablespace creation instruction may be: create tablespace <spc_numa_x> <datafile> numa x. Herein, "create tablespace <spc_numa_x>" indicates to create a tablespace <spc_numa_x>, "<spc_numa_x>" indicates a name of the to-be-created tablespace, <datafile> indicates a name of a file corresponding to the tablespace in the external memory, and "numa x" is an identifier that indicates a node corresponding to the tablespace in a plurality of nodes of the computer apparatus.

Further, the at least one tablespace created in step 301 may include a read-write tablespace and a read-only tablespace. The read-write tablespace supports a read operation and a write operation, and the read-only tablespace supports only a read operation and does not support a write operation. The created read-write tablespace may correspond to one node in the plurality of nodes. Different read-write tablespaces may correspond to a same node or different nodes. A read-only tablespace corresponds to all of the plurality of nodes. As shown in FIG. 4, the tablespaces 1, 2, and 3 are read-write tablespaces and each correspond to one node. The tablespace 4 is a read-only tablespace and corresponds to the nodes 1, 2, 3, and 4. Data in each tablespace is loaded to a corresponding node. Therefore, a read-write tablespace is loaded to only one node, and a read-only tablespace can be loaded to any one of the plurality of nodes.

For example, the foregoing tablespace creation instruction may be a creation instruction for a read-write tablespace, and a creation instruction for a read-only tablespace may be: create tablespace <spc_numa_x> <datafile> numa replication. Herein, "create tablespace <spc_numa_x>" indicates to create a tablespace <spc_numa_x>, "<spc_numa_x>" indicates a name of the to-be-created tablespace, <datafile> indicates a name of a file corresponding to the tablespace in the external memory, and "numa replication" is an identifier that indicates that the tablespace corresponds to all the nodes of the computer apparatus.

It should be noted that, in this embodiment of this disclosure, for example, when a tablespace is being read/written, data in the tablespace is loaded to a node corresponding to the tablespace. Certainly, the data in the tablespace may not be loaded to the node corresponding to the tablespace. This is not limited in this embodiment of this disclosure.

Step 302: Establish a first connection to a client, where the first connection is used to transmit a read/write request sent by the client.

After the at least one tablespace is created, the computer apparatus may establish the first connection to the client based on a connection request sent by the client. The first connection may be any communication connection, for example, a Transmission Control Protocol (TCP) connection or a Hypertext Transfer Protocol (HTTP) connection. The connection established between the computer apparatus and the client may also be referred to as a session.

The computer apparatus can receive, through the first connection, at least one read/write request sent by the client. The at least one read/write request may include a read/write request for accessing a first tablespace. All read/write requests transmitted through the first connection are read/write requests for a same service, and these read/write requests are read/write requests for accessing the first tablespace. A node corresponding to the first tablespace may be determined based on a feature of the service.

Step 303: Determine the first tablespace corresponding to the first connection.

In this embodiment of this disclosure, each tablespace corresponds to a service, the tablespace is used to store only data of the corresponding service, and different services correspond to different tablespaces. In step 303, the computer apparatus may determine a tablespace corresponding to a service corresponding to the first connection as the first tablespace.

Step 304: Determine a first node corresponding to the first tablespace in the plurality of nodes.

As described in step 301, each tablespace created by the computer apparatus corresponds to a node. Therefore, in step 304, the computer apparatus may obtain a correspondence between a tablespace and a node, and search, based on the correspondence, for the first node corresponding to the first tablespace.

In a process of creating the tablespace in step 301, the computer apparatus may obtain the correspondence between a tablespace and a node. The computer apparatus may store the correspondence locally in the computer apparatus, or certainly, may store the correspondence in another device outside the computer apparatus, provided that the computer apparatus can obtain the correspondence in step 303.

For example, a correspondence between tablespaces and nodes in FIG. 4 may be shown in Table 1. The tablespace 1 corresponds to the node 1, the tablespace 2 corresponds to the node 2, the tablespace 3 corresponds to the node 3, and the tablespace 4 corresponds to the nodes 1, 2, and 3. If the first tablespace is the tablespace 3, in step 304, the computer apparatus may determine the node 3 corresponding to the tablespace 3 as the first node.

TABLE 1

| Tablespace | Node |
| --- | --- |
| 1 | 1 |
| 2 | 2 |
| 3 | 3 |
| 4 | 1, 2, and 3 |

Step 305: Load data in the first tablespace to a memory in the first node.

After determining the first tablespace and the first node, the computer apparatus may load the data in the first tablespace to the memory in the first node.

Step 306: Process a read/write request on the first connection by using a first working thread, where the first working thread is generated by a processor in the first node.

The computer apparatus may fixedly process the read/write request on the first connection by using the first working thread generated by the processor in the first node. In addition, regardless of a quantity of read/write requests on the first connection, all the read/write requests on the first connection are processed by using the first working thread.

In this embodiment of this disclosure, the data in the first tablespace may be loaded to the first node, the read/write request on the first connection accesses the first tablespace, and the computer apparatus can process the read/write request by using the first working thread generated by the processor in the first node. In this way, both the first working thread and the read/written data in the first tablespace are located on the first node, to avoid cross-node data reading/writing and improve data read/write efficiency.

Figure 5A:
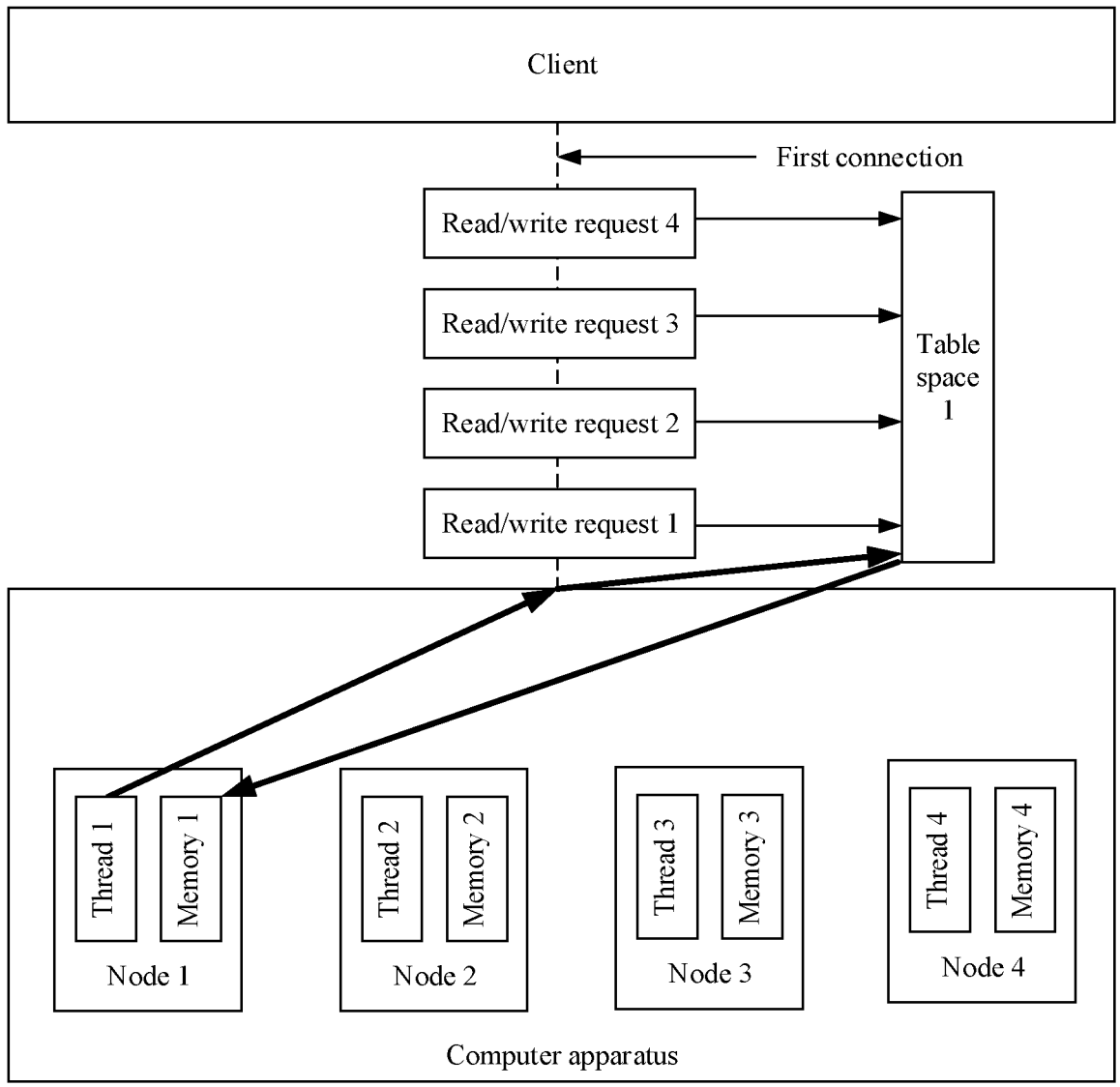
FIG. 5A is a schematic diagram of a data read/write process according to an embodiment of this disclosure.

For example, as shown in FIG. 5A, read/write requests 1, 2, 3, and 4 on the first connection are all used to access the first tablespace (a tablespace 1), and the first node corresponding to the first tablespace (the tablespace 1) is a node 1. The computer apparatus loads data in the tablespace 1 to a memory (a memory 1) in the node 1. In a process in which these read/write requests are process by using the first working thread (a thread 1) generated by a processor in the node 1, the thread 1 can read/write data that is in the tablespace 1 and that is loaded to the memory 1. It can be learned that the memory 1 to which data to be accessed by the read/write request on the first connection is loaded and the thread 1 that reads/writes the data are both located in the node 1. Therefore, cross-node data reading/writing by the thread 1 is avoided.

In this embodiment of this disclosure, a read/write request transmitted through a connection of each service feature may access only a tablespace corresponding to the service feature, and tablespaces corresponding to each service feature correspond to a same node of the computer apparatus. For example, assuming that the service feature is an IP address of a client, each client accesses a tablespace corresponding to the IP address of the client, and does not access a tablespace corresponding to an IP address of another client. After the first node is determined based on a feature of the first connection, it may be considered that nodes corresponding to tablespaces (for example, the first tablespace) that are accessed by the read/write requests on the first connection are all the first node. If all data in the tablespaces that are accessed by the read/write requests on the first connection is loaded to the first node, and the read/write request loaded to the first node is read/written by using the working thread in the first node, cross-node data reading/writing can be totally avoided.

Figure 5B:
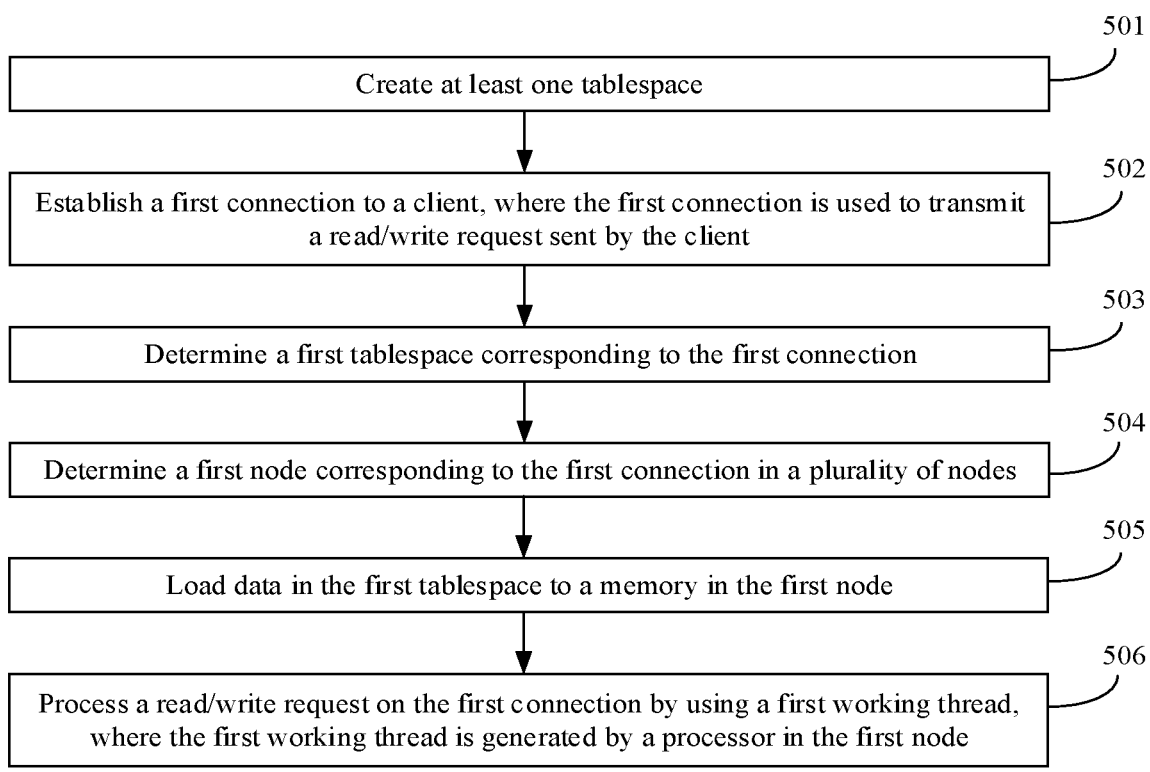
FIG. 5B is a flowchart of another data read/write method for a database according to an embodiment of this disclosure.

FIG. 5B is a flowchart of another data read/write method for a database according to an embodiment of this disclosure. The data read/write method may be performed by the computer apparatus shown in FIG. 2. As shown in FIG. 5B, the data read/write method may include the following steps.

Step 501: Create at least one tablespace.

Different from step 301, in step 501, the tablespace created by the computer apparatus does not correspond to a node.

Step 502: Establish a first connection to a client, where the first connection is used to transmit a read/write request sent by the client.

For step 502, refer to step 302. Details are not described in this embodiment of this disclosure.

Step 503: Determine a first tablespace corresponding to the first connection.

For step 503, refer to step 303. Details are not described in this embodiment of this disclosure.

Step 504: Determine a first node corresponding to the first connection in a plurality of nodes.

Optionally, the computer apparatus may determine the first node based on a feature of the first connection. The feature of the first connection may include an IP address of the client, a name of a user who uses the client, a name of an application corresponding to the first connection, or the like.

For example, the computer apparatus may select a node from the computer apparatus as the first node based on the feature of the first connection. For a selection process, refer to the process in which the computer selects a node based on a feature of a service corresponding to a tablespace in step 301. Details are not described herein in this embodiment of this disclosure.

Step 505: Load data in the first tablespace to a memory in the first node.

For step 505, refer to step 305. Details are not described in this embodiment of this disclosure.

Step 506: Process a read/write request on the first connection by using a first working thread, where the first working thread is generated by a processor in the first node.

For step 506, refer to step 306. Details are not described in this embodiment of this disclosure.

In this embodiment of this disclosure, the data in the first tablespace may be loaded to the first node, the read/write request on the first connection accesses the first tablespace, and the computer apparatus can process the read/write request by using the first working thread generated by the processor in the first node. In this way, both the first working thread and the read/written data in the first tablespace are located on the first node, to avoid cross-node data reading/writing and improve data read/write efficiency.

Figure 6:
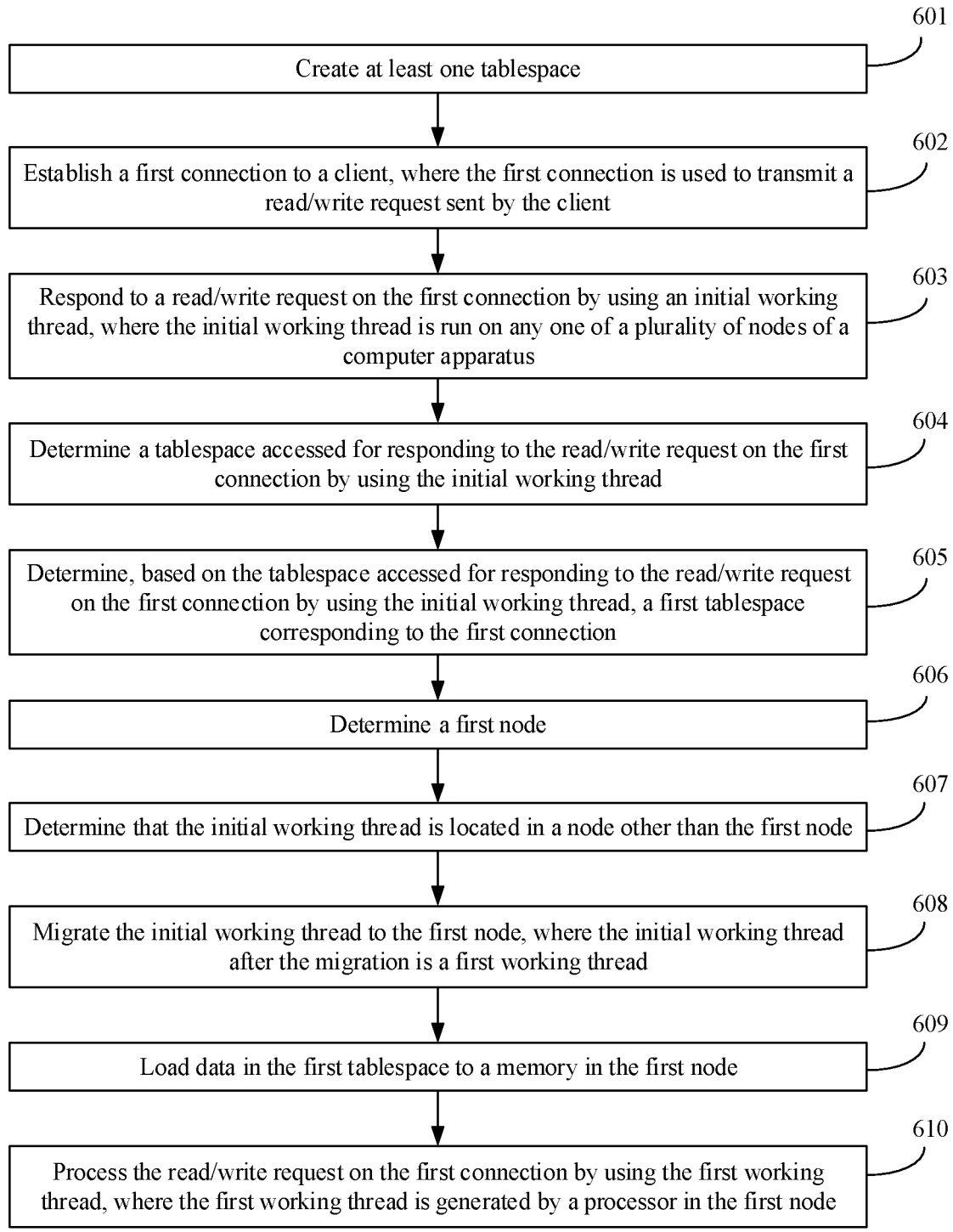
FIG. 6 is a flowchart of still another data read/write method for a database according to an embodiment of this disclosure.

For another example, FIG. 6 is a flowchart of still another data read/write method for a database according to an embodiment of this disclosure. The data read/write method may be performed by the computer apparatus shown in FIG. 2. As shown in FIG. 6, the data read/write method may include the following steps.

Step 601: Create at least one tablespace.

In step 601, the at least one created tablespace may correspond to a node (refer to step S301), or may not correspond to a node (refer to step S501). This is not limited in this embodiment of this disclosure.

Step 602: Establish a first connection to a client, where the first connection is used to transmit a read/write request sent by the client.

For step 602, refer to step 302. However, different from step 302, in step 602 in this embodiment, the read/write request transmitted through the first connection may include a read/write request for accessing one or more tablespaces.

Step 603: Respond to a read/write request on the first connection by using an initial working thread, where the initial working thread is run on any one of a plurality of nodes of the computer apparatus.

After the computer apparatus establishes the first connection to the client, the computer apparatus may first start the initial working thread (which may be located in any node of the computer apparatus), and then respond to the read/write request on the first connection by using the initial working thread.

In a process of responding to the read/write request on the first connection, the initial working thread accesses a tablespace that needs to be accessed by the read/write request. It should be noted that there may be at least one read/write request on the first connection, and the initial working thread may sequentially respond to the at least one read/write request on the first connection.

Figure 7:
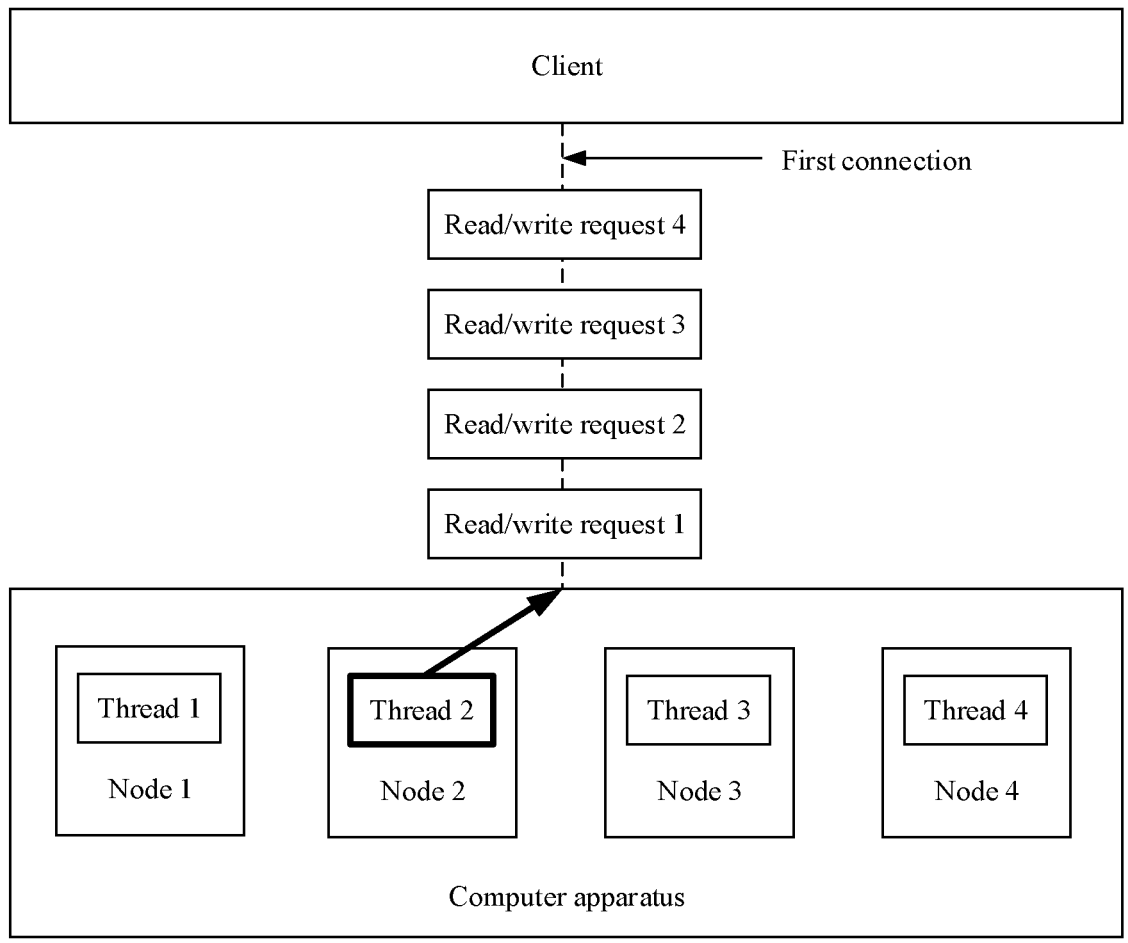
FIG. 7 is a schematic diagram of another data read/write process according to an embodiment of this disclosure.

For example, as shown in FIG. 7, it is assumed that the computer apparatus includes a node 1, a node 2, a node 3, and a node 4, the node 1 has a thread 1, the node 2 has a thread 2, the node 3 has a thread 3, and the node 4 has a thread 4. After the computer apparatus establishes the first connection to the client, the computer apparatus may use the thread 2 in the node 2 as the initial working thread, and sequentially respond to read/write requests 1, 2, 3, and 4 on the first connection by using the thread 2.

Step 604: Determine a tablespace accessed for responding to the read/write request on the first connection by using the initial working thread.

Step 605: Determine, based on the tablespace accessed for responding to the read/write request on the first connection by using the initial working thread, a first tablespace corresponding to the first connection.

In a process of responding to the read/write request on the first connection by using the initial working thread, the computer apparatus may determine tablespaces accessed for responding to read/write requests on the first connection by using the initial working thread, and then may determine the first tablespace based on the tablespaces in a plurality of implementations.

In a first implementation, the computer apparatus may determine, as the first tablespace, a tablespace that is the first to be accessed in the process of responding to the read/write request on the first connection by using the initial working thread. It can be learned that in the process of responding to the read/write request on the first connection by using the initial working thread, the computer apparatus needs to detect only the tablespace that is the first to be accessed by the read/write request on the first connection.

For example, a relationship between tablespaces in the database and pages in the tablespaces is shown in Table 2. If a page that is the first to be accessed in the process of responding to the read/write request on the first connection by using the initial working thread is a page 4, it may be determined that a tablespace 2 in which the page 4 is located is the tablespace that is the first to be accessed by the initial working thread, and it is determined that the tablespace 2 is the first tablespace.

TABLE 2

| Tablespace | Page |
|---|---|
| 1 | 1, 2, and 3 |
| 2 | 4 and 5 |
| 3 | 6 |
| 4 | 7 and 8 |

In a second implementation, the computer apparatus may determine, as the first tablespace, a tablespace that is most frequently accessed within predetermined duration in the process of responding to the read/write request on the first connection by using the initial working thread. It can be learned that in the process of responding to the read/write request on the first connection by using the initial working thread, the computer apparatus needs to collect statistics about tablespaces that need to be accessed by the read/write request on the first connection within the predetermined duration, and determine the first tablespace that is most frequently accessed in these tablespaces.

For example, for the tablespaces shown in Table 2, it is assumed that the tablespaces 1, 4, and 5 are accessed within first duration for responding to the read/write request on the first connection by using the initial working thread. In addition, as shown in Table 3, within the predetermined duration, a frequency of accessing the tablespace 1 is two times/minute, a frequency of accessing the tablespace 4 is three times/minute, and a frequency of accessing the tablespace 5 is five times/minute. It can be learned that the tablespace 5 is most frequently accessed in the first duration for responding to the read/write request on the first connection by using the initial working thread. In this case, the computer apparatus may determine the tablespace 5 as the first tablespace.

TABLE 3

| Tablespace | Frequency of accessing a tablespace within the preset duration (times/minute) |
|---|---|
| 1 | 2 |
| 4 | 3 |
| 5 | 5 |

Step 606: Determine a first node corresponding to the first connection or the first tablespace.

Because the at least one tablespace created in step 601 may correspond to a node or may not correspond to a node, when the created tablespace corresponds to a node, the first node corresponding to the first tablespace may be directly determined. When the created tablespace does not correspond to a node, reference may be made to step S504 to determine the corresponding first node based on a feature of the first connection.

Step 607: Determine the initial working thread is located in a node other than the first node.

After determining the first node, the computer apparatus needs to determine whether the initial working thread is located in a node other than the first node. In this embodiment of this disclosure, an example in which the initial working thread is located in a node other than the first node is used.

Step 608: Migrate the initial working thread to the first node, where the initial working thread after the migration is a first working thread.

Figure 8:
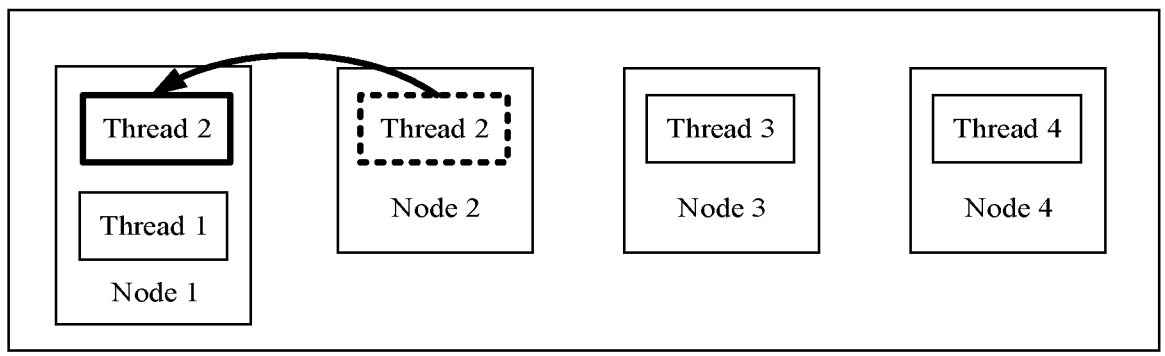
FIG. 8 is a schematic diagram of another data read/write process according to an embodiment of this disclosure.

As shown in FIG. 8, assuming that the first node is a node 1, and a node 2 in which the initial working thread (a thread 2) is located is different from the node 1, the computer apparatus may migrate the thread 2 from the node 2 to the node 1.

It should be noted that the initial working thread before the migration and the initial working thread after the migration (that is, the first working thread) may be a same working thread, but the initial working thread before the migration is not located in the first node, and the initial working thread after the migration (that is, the first working thread) is located in the first node.

Alternatively, the initial working thread before the migration and the initial working thread after the migration (that is, the first working thread) are different working threads. When migrating the initial working thread, the computer apparatus may start a working thread in the first node, and migrate all data required for working by the initial working thread to the working thread in the first node, so that a function of the initial working thread is transferred to the working thread in the first node, to obtain the initial working thread (that is, the first working thread) after the migration.

Step 609: Load data in the first tablespace to a memory in the first node.

For step 609, refer to step 305. Details are not described in this embodiment of this disclosure.

It should be noted that in a process of responding to the read/write request on the first connection, the initial working thread accesses a tablespace that needs to be accessed by the read/write request. In the access process, the data in the first tablespace may be loaded to the memory in the first node, or may not be loaded to the memory in the first node. If the data in the first tablespace is not loaded to the memory in the first node in the access process, step 609 may be performed to ensure that the data in the first tablespace is loaded to the memory in the first node. If the data in the first tablespace has been loaded to the memory in the first node in the access process, step 609 may not need to be performed.

Step 610: Process the read/write request on the first connection by using the first working thread, where the first working thread is generated by a processor in the first node.

For step 610, refer to step 306. Details are not described in this embodiment of this disclosure.

In a possible implementation of this disclosure, when the node in which the initial working thread is located is the first node, the computer apparatus may not perform step 607 and step 608, determines the initial working thread as the first working thread, and directly performs step 609.

In another possible implementation of this disclosure, the computer apparatus may not perform step 607 and step 608. Instead, after step 606, the computer apparatus directly starts another working thread in the first node, uses the working thread as the first working thread, and performs step 609.

Figure 9:
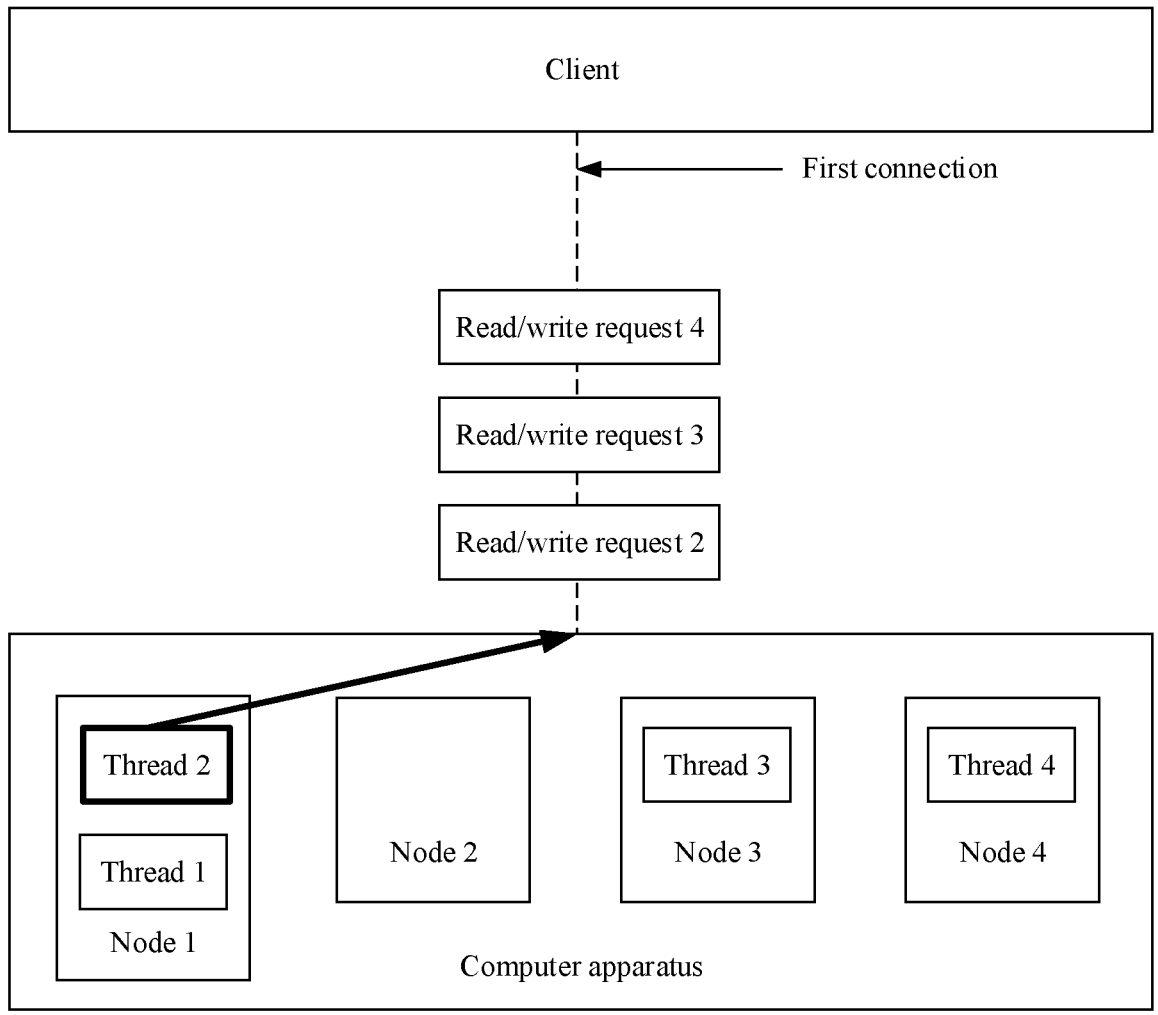
FIG. 9 is a schematic diagram of another data read/write process according to an embodiment of this disclosure.
Figure 10:
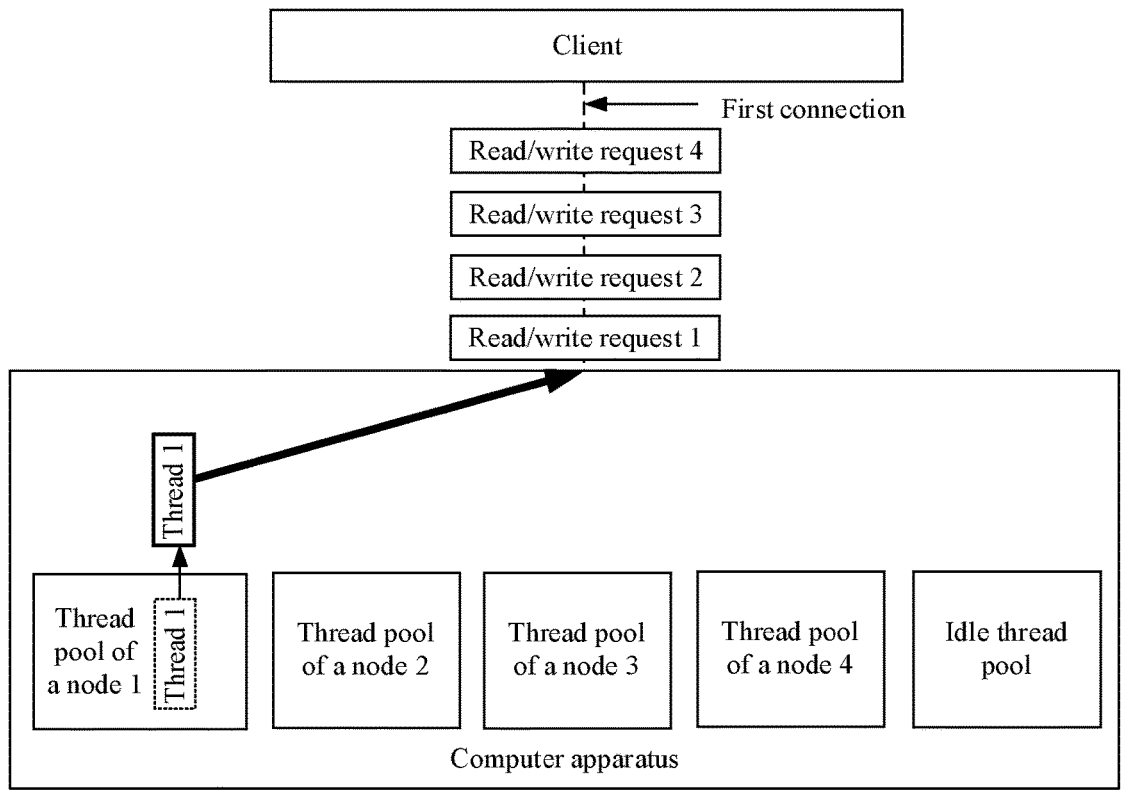
FIG. 10 is a schematic diagram of another data read/write process according to an embodiment of this disclosure.
Figure 11:
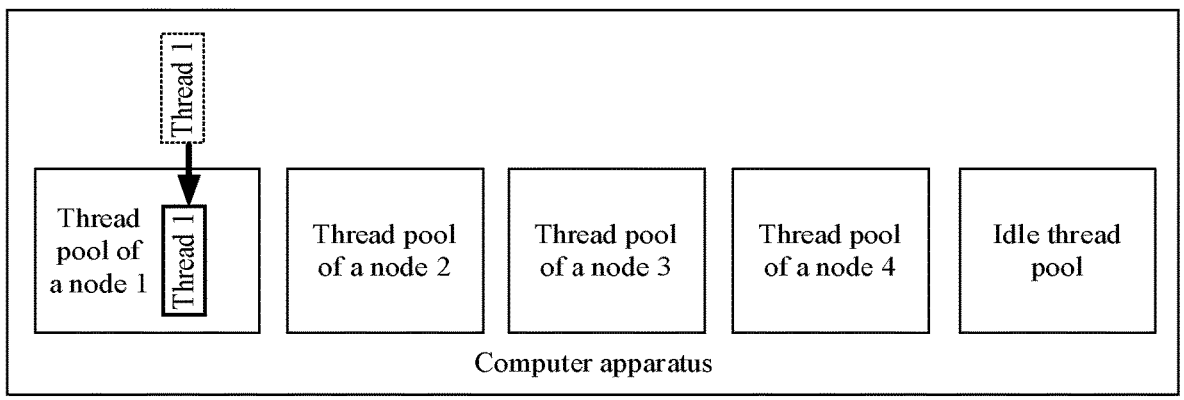
FIG. 11 is a schematic diagram of another data read/write process according to an embodiment of this disclosure.
Figure 12:
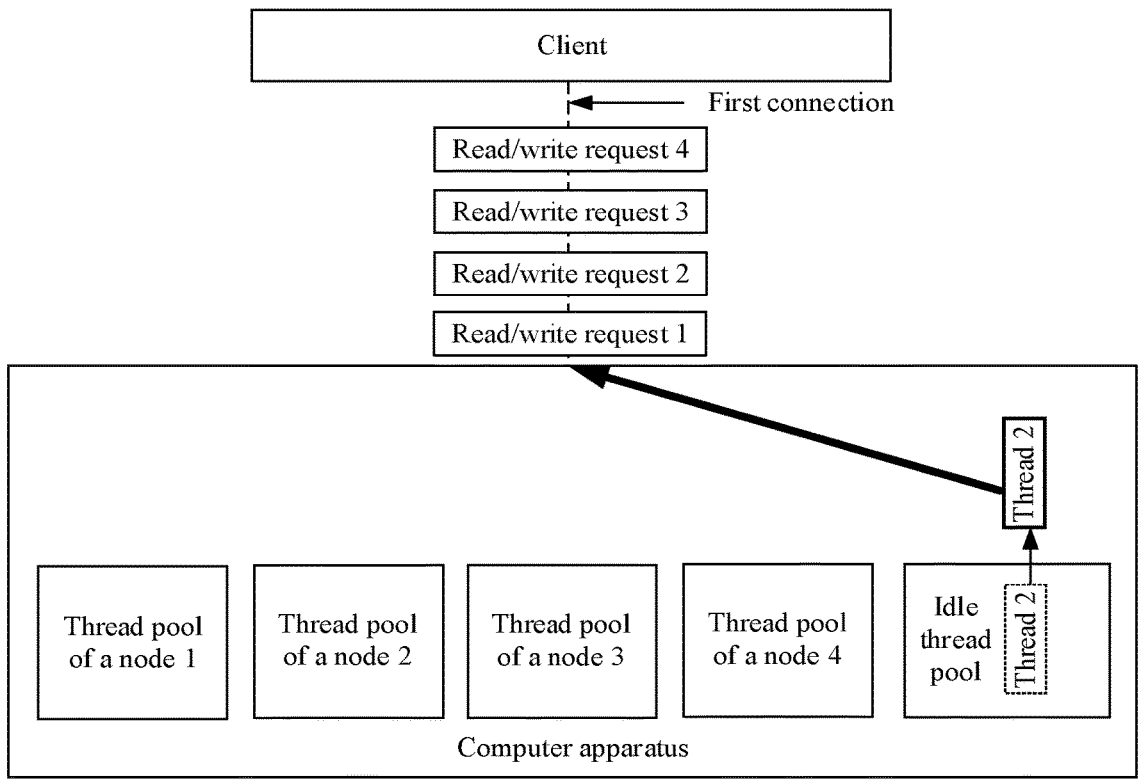
FIG. 12 is a schematic diagram of another data read/write process according to an embodiment of this disclosure.
Figure 13:
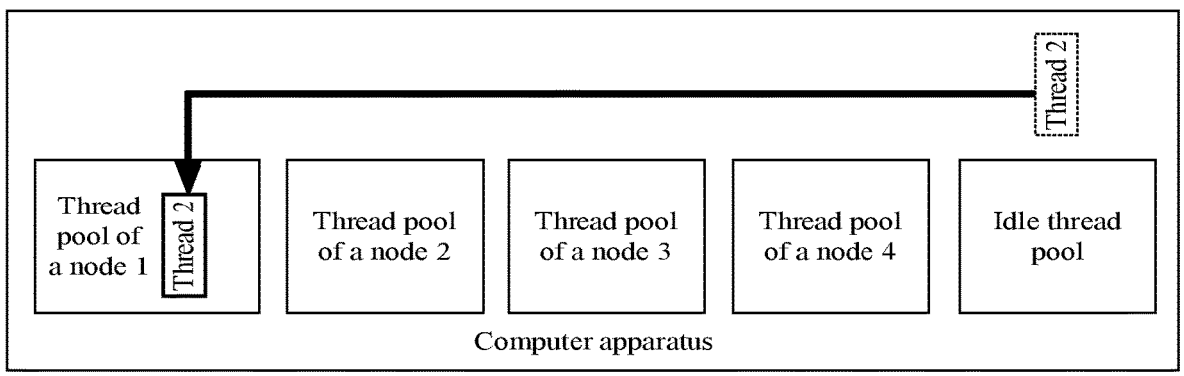
FIG. 13 is a schematic diagram of another data read/write process according to an embodiment of this disclosure.

As shown in FIG. 9, it is assumed that before being migrated to a node 1, the initial working thread (a thread 2) may be used to respond to a read/write request 1 on the first connection, but has not been used to respond to read/write requests 2, 3, and 4 on the first connection. After the initial working thread (the thread 2) is migrated to the first node (the node 1) to obtain the first working thread, the first working thread (the thread 2 migrated to the node 1) may be used to sequentially respond to the read/write requests 2, 3, and 4 on the first connection.

It can be learned that, regardless of whether the initial working thread is migrated, in this embodiment of this disclosure, the first working thread in the first node needs to be used to process the read/write request on the first connection.

In this embodiment of this disclosure, there is a high probability (for example, 99%, 98%, or 80%) that a read/write request sent by the client through the first connection accesses the first tablespace, and there is a low probability (for example, 1%, 2%, or 20%) that a read/write request sent by the client through the first connection accesses another tablespace. Correspondingly, after the computer apparatus establishes the first connection to the client, there is a high probability that each tablespace that the client needs to access is the first tablespace. Therefore, if data in a tablespace that is to be accessed by the read/write request on the first connection is loaded to the first node, and the read/write request loaded to the first node is read/written by using the first working thread in the first node, there is a high probability that cross-node data reading/writing can be avoided.

For example, the Transaction Processing Performance Council (TPC) manages several commodity warehouses in different regions. It is assumed that each warehouse is responsible for supplying goods to 10 points of sale, and each point of sale serves 3000 clients. In this scenario, table data of a plurality of commodity warehouses accessed by a client may be divided into a plurality of partitions, and the partitions are distributed in a plurality of tablespaces. Tablespaces stored in a partition of each commodity warehouse correspond to a same node. In an order submitted by each client, about 90% of products are in stock in a warehouse corresponding to the client (that is, a warehouse corresponding to a point of sale that directly serves the client), and 10% of products are not in stock in the warehouse and need be supplied by another warehouse. In this way, there is a high probability (about 90%) that each client accesses a tablespace in which a partition of the warehouse corresponding to the client is located. Therefore, the computer apparatus may determine a tablespace that is the first to be accessed by the client as the first tablespace, and determine a node corresponding to the tablespace as the first node. After the first node is determined, it may be considered that there is a high probability that nodes corresponding to tablespaces that are to be accessed by the read/write requests on the first connection are all the first node. The read/write request on the first connection is processed by using the first working thread in the first node corresponding to the first tablespace, so that there is a high probability that cross-node data reading/writing can be avoided.

Optionally, after step 606, if the first node is different from the node in which the initial working thread is located, the computer apparatus may not perform step 607 and step 608, but changes the node corresponding to the first tablespace from the first node to the node in which the initial working thread is located, then processes the read/write request on the first connection by using the initial working thread. In this way, when processing the read/write request on the first connection by using the initial working thread, the computer apparatus may load, to the node in which the initial working thread is located, data in the first tablespace that is accessed by the read/write request, to reduce a probability of cross-node data reading/writing.

In step 301, an example in which a tablespace corresponds to a node and an identifier carried in the tablespace is an identifier of a node corresponding to the tablespace is used. Optionally, the identifier carried in the tablespace may also be an identifier of a buffer in the node corresponding to the tablespace. It can be considered that there is a correspondence between a tablespace and a buffer in the node. Optionally, data in a tablespace may be loaded to a corresponding buffer. Certainly, the data in the tablespace may not be loaded to the corresponding buffer. This is not limited in this embodiment of this disclosure.

When the identifier carried in the tablespace is the identifier of the buffer, the tablespace creation instruction may be: create tablespace <spc_numa_x> <datafile> <buf_x>. Herein, "create tablespace <spc_numa_x>" indicates to create a tablespace <spc_numa_x>, "<spc_numa_x>" indicates a name of the to-be-created tablespace, <datafile> indicates a name of a file corresponding to the tablespace in an external memory, and "<buf_x>" is an identifier of the tablespace and indicates the buffer corresponding to the tablespace.

In addition, when the identifier carried in the tablespace is the identifier of the buffer, the buffer in the node also carries an identifier of the node in which the buffer is located. Before the tablespace is created, a buffer may be created based on a buffer creation instruction. The buffer creation instruction may be: create database buffer <buf_x> numa x, where "create database buffer <buf_x>" indicates to create a buffer <buf_x>, "<buf_x>" is a name of the to-be-created buffer, and "numa x" is an identifier of a node and indicates a node in which the to-be-created buffer is located.

When an identifier carried in a tablespace is an identifier of a buffer, when determining the first node corresponding to the first connection or the first tablespace in the plurality of nodes, the computer apparatus may first determine a first buffer corresponding to the first connection or the first tablespace, and then determine a node in which the first buffer is located as the first node.

It should be noted that each page in the database can be accessed by only one working thread at a same moment. Therefore, when a plurality of working threads all need to access a page, the working threads need to sequentially access the page. Consequently, efficiency of accessing the page by the working threads is relatively low.

To improve page access efficiency of the working threads, table data in a tablespace may be partitioned to obtain a plurality of partitions, and then the partitions are stored in at least one tablespace. Each partition includes at least one page, and a page in a partition may be a page in the table data, or may be a page obtained after a page in the table data is partitioned.

For example, the table data includes a page 1.1, a page 1.2, and a page 1.3, and a partition 2.1, a partition 2.2, and a partition 2.3 are obtained after the table data is partitioned. The partition 2.1 includes a page 2.11 and a page 2.12, the partition 2.2 includes the page 1.2, and the partition 2.3 includes the page 1.3. The page 1.1 includes the page 2.11 and the page 2.12. It can be learned that in a process of partitioning the table data, the page 1.1 is divided into the page 2.11 and the page 2.12. In this way, if a working thread a needs to access the page 2.11, and a working thread b needs to access the page 2.12, the two working threads may simultaneously access the pages that need to be accessed. However, if the table data is not partitioned, because both the page 2.11 and the page 2.12 belong to the page 1.1, the working thread a and the working thread b need to sequentially access the page 1.1. Therefore, efficiency of accessing a page by working threads can be improved by partitioning the table data.

Optionally, the working thread may partition the table data in any partitioning manner, for example, a hash, range, or round-robin manner.

Optionally, the computer apparatus may further migrate data in a tablespace at a proper time.

For example, the computer apparatus may further detect (for example, periodically detect) whether a quantity of working threads that access the first tablespace in target duration is less than a first quantity threshold. If the quantity of working threads that access the first tablespace in the target duration is less than the first quantity threshold, it may be determined that the first tablespace is less frequently accessed. In this case, the computer apparatus may migrate all data in the first tablespace to a second tablespace. The second tablespace may be any tablespace other than the first tablespace. Optionally, a quantity of working threads that access the second tablespace in the target duration may be greater than or equal to the first quantity threshold. In this way, the computer apparatus migrates the data in the first tablespace that is less frequently accessed to the second tablespace that is more frequently accessed, to avoid a tablespace that is less frequently accessed.

For another example, the computer apparatus may further detect (for example, periodically detect) whether the quantity of working threads that access the first tablespace in the target duration is greater than a second quantity threshold. The second quantity threshold may be greater than the first quantity threshold. If the quantity of working threads accessing the first tablespace in the target duration is greater than the second quantity threshold, the computer apparatus may determine that the first tablespace is accessed excessively frequently. In this case, the computer apparatus may migrate at least a part of data in the first tablespace to a third tablespace. The third tablespace may be any tablespace other than the first tablespace. Optionally, a quantity of working threads that access the third tablespace in the target duration may be less than or equal to the second quantity threshold. In this way, the computer apparatus migrates at least the part of the data in the first tablespace that is more frequently accessed to the third tablespace that is less frequently accessed, so that the first tablespace is less frequently accessed.

It should be noted that when a tablespace is accessed excessively frequently, efficiency of accessing the tablespace by each working thread is reduced. However, in this embodiment of this disclosure, at least a part of data in the tablespace is migrated, so that the tablespace can be less frequently accessed, and efficiency of accessing the tablespace by each working thread is improved.

Optionally, the computer apparatus further supports load balancing between nodes. For example, the computer apparatus may also detect loads (related to memory consumption and/or working thread density of a node) of a plurality of nodes. When it is determined that a load of the first node is higher than a first load threshold, and a load of a second node is lower than a second load threshold, it indicates that the load of the first node is higher, and the load of the second node is lower. The first load threshold is greater than or equal to the second load threshold. In this case, the computer apparatus may migrate data in a part of tablespaces corresponding to the first node to the second node, and modify correspondences between the migrated tablespaces and nodes, to implement load balancing between nodes.

For example, when determining that the load of the first node is higher than the first load threshold and the load of the second node is lower than the second load threshold, the computer apparatus may immediately migrate data that is in a tablespace corresponding to the first node and that is loaded to the memory in the first node to a memory in the second node. Certainly, the computer apparatus may not migrate the data immediately, but migrate a page to the memory in the second node each time a read/write request for the page in the data is received. In this way, resource overheads at a moment at which it is determined that the load of the first node is higher than the first load threshold and the load of the second node is lower than the second load threshold can be reduced.

Optionally, the computer apparatus may further enter a thread pool mode. For example, when a quantity of connections established between the computer apparatus and the client is greater than a quantity of working threads in the computer apparatus, the computer apparatus may further enter a thread pool mode.

For example, the computer apparatus may maintain a first thread pool of the first node and a second thread pool in the thread pool mode. A working thread in the first thread pool is used to process a read/write request on a connection carrying a first identifier, and a working thread in the second thread pool is used to process a read/write request on a connection that does not carry an identifier.

After determining the first node corresponding to the first connection or the first tablespace in the plurality of nodes, the computer apparatus may enable the first connection to carry the first identifier (an identifier indicating the first node). Then, because the first connection carries the first identifier indicating the first node, the computer apparatus may select an idle working thread from the first thread pool of the first node as the first working thread, and respond to the read/write request on the first connection by using the first working thread. Before the computer apparatus needs to respond to the read/write request on the first connection by using the initial working thread, because the initial working thread does not carry an identifier indicating any node, the computer apparatus may select an idle thread from the second thread pool as the initial working thread, and respond to the read/write request on the first connection by using the initial working thread.

After a working thread completes processing a read/write request on a connection, if the working thread is selected from a thread pool, the working thread may be added to the thread pool again. For example, after the initial working thread completes processing the read/write request on the first connection, the initial working thread may be added to the second thread pool. After the first working thread completes processing the read/write request on the first connection, the first working thread may be added to the first thread pool.

In the thread pool mode, when the computer apparatus responds to a read/write request on a connection by using a working thread, there needs to be an idle working thread in a corresponding thread pool, so that the computer apparatus can sequentially process read/write requests on a plurality of connections.

In conclusion, in the data read/write method provided in embodiments of this disclosure, there is a high probability that the read/write request sent by the client through the first connection accesses the first tablespace. After the computer apparatus establishes the first connection to the client, there is a high probability that each tablespace that the client needs to access is the first tablespace. Therefore, if data in a tablespace that is to be accessed by the read/write request on the first connection is loaded to the first node, and the read/write request loaded to the first node is read/written by using the first working thread in the first node, there is a high probability that cross-node data reading/writing can be avoided.

The foregoing describes in detail the data read/write method for a database provided in this disclosure with reference to FIG. 1 to FIG. 13. The following describes a data read/write apparatus for a database provided in this disclosure with reference to FIG. 14.

Figure 14:
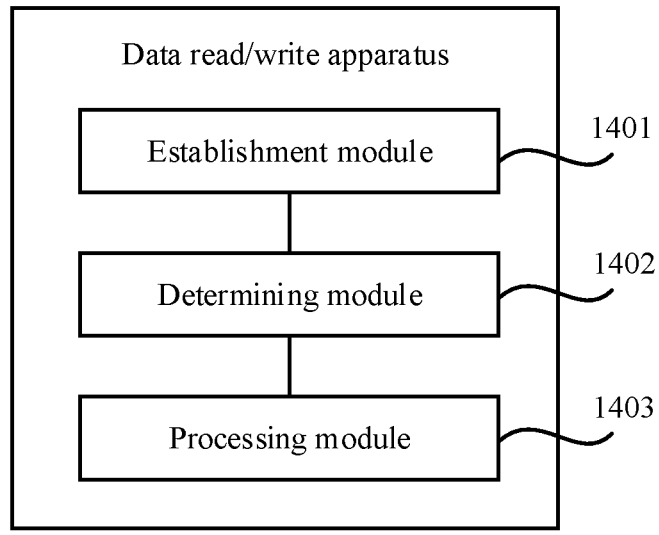
FIG. 14 is a block diagram of a data read/write apparatus for a database according to an embodiment of this disclosure.

FIG. 14 is a block diagram of a data read/write apparatus for a database according to an embodiment of this disclosure. The computer apparatus provided in embodiments of this disclosure may include the data read/write apparatus. As shown in FIG. 14, the data read/write apparatus includes an establishment module 1401 configured to establish a first connection to a client, where the first connection is used to transmit a read/write request sent by the client, a determining module 1402 configured to determine a first tablespace corresponding to the first connection, and determine a first node corresponding to the first connection or the first tablespace in a plurality of nodes of the computer apparatus, where each of the plurality of nodes includes a processor and a memory, and a processing module 1403 configured to load data in the first tablespace to a memory in the first node, and process a read/write request on the first connection by using a first working thread, where the first working thread is generated by a processor in the first node.

In conclusion, in the data read/write apparatus provided in this embodiment of this disclosure, there is a high probability that the read/write request sent by the client through the first connection accesses the first tablespace. After the establishment module establishes the first connection to the client, there is a high probability that each tablespace that the client needs to access is the first tablespace. Therefore, if the processing module loads data in a tablespace that is to be accessed by the read/write request on the first connection to the first node, and the processing module reads/writes the read/write request loaded to the first node by using the first working thread in the first node, there is a high probability that cross-node data reading/writing can be avoided.

The data read/write apparatus is further configured to perform other steps in the data read/write methods shown in FIG. 3, FIG. 5B, and FIG. 6. For example, the establishment module 1401 is configured to perform step 302 in FIG. 3, step 502 in FIG. 5B, and step 602 in FIG. 6. The determining module 1402 is configured to perform steps 303 and 304 in FIG. 3, steps 503 and 504 in FIG. 5B, and steps 603, 604, 605, 606, and 607 in FIG. 6. The processing module 1403 is configured to perform steps 301, 305, and 306 in FIG. 3, steps 501, 505, and 506 in FIG. 5B, and steps 601, 608, 609, and 610 in FIG. 6. For a specific procedure of performing each step by each module, refer to the foregoing descriptions of FIG. 3, FIG. 5B, and FIG. 6. Details are not described herein again.

Figure 15:
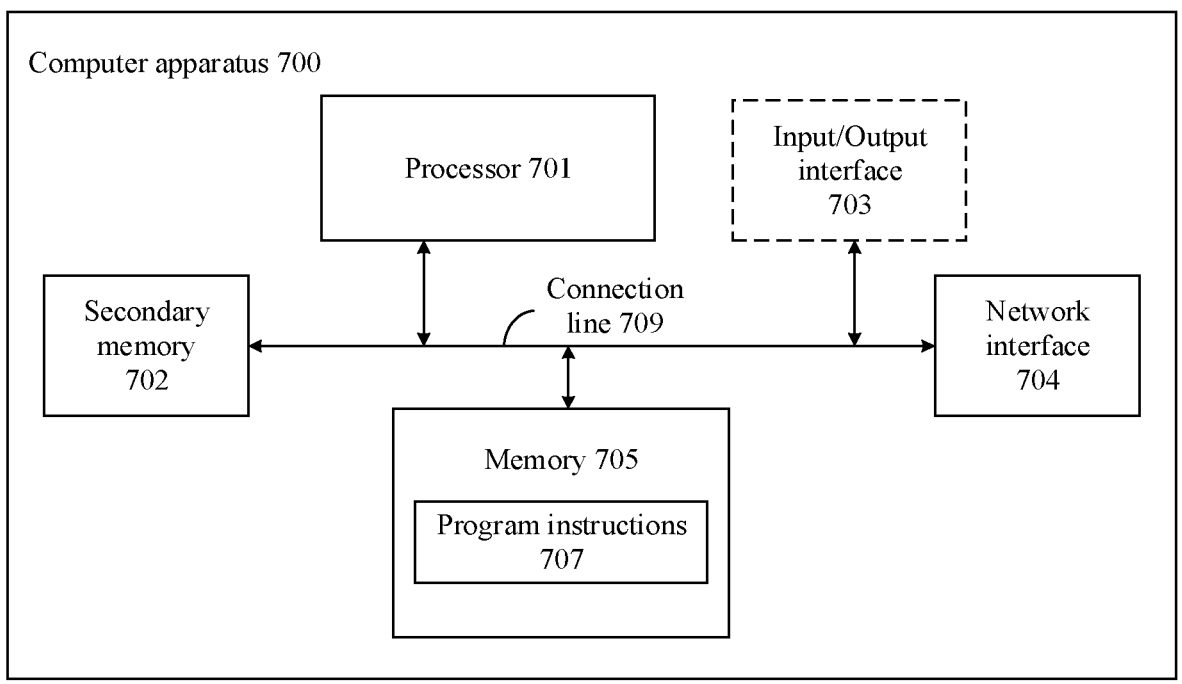
FIG. 15 is a schematic diagram of a structure of a computer apparatus 700 according to an embodiment of this disclosure.

FIG. 15 is a schematic diagram of a structure of a computer apparatus 700 according to an embodiment of this disclosure. The computer apparatus 700 in this embodiment may be a specific implementation of the computer apparatus in the foregoing embodiments.

As shown in FIG. 15, the computer apparatus 700 includes a processor 701, and the processor 701 is connected to a memory 705. The processor 701 may be computing logic such as a field-programmable gate array (FPGA), or a digital signal processor (DSP), or any combination of the foregoing computing logic. In addition, the processor 701 may be a single-core processor or a multi-core processor.

The memory 705 may be a random-access memory (RAM), a flash, a read-only memory (ROM), an erasable programmable ROM (EPROM), an electrically EPROM (EEPROM), a register, or a storage medium of any other form known in the art. The memory may be configured to store program instructions 707. When the program instructions 707 are executed by the processor 701, the processor 701 performs the methods in the foregoing embodiments.

A connection line 709 is configured to transmit information between components of the computer apparatus. The connection line 709 may use a wired connection manner or a wireless connection manner. This is not limited in this disclosure. The connection line 709 is further connected to a network interface 704.

The network interface 704 implements communication with another device or network 711 through a connection apparatus such as, but not limited to, a cable or an electrical twisted pair. The network interface 704 may also be interconnected with the network 711 in a wireless manner.

Some features in this embodiment of this disclosure may be implemented/supported by the processor 701 by executing program instructions or software code in the memory 705. The software components loaded on the memory 705 may be summarized in terms of functions or logic, for example, the establishment module 1401, the determining module 1402, and the processing module 1403 shown in FIG. 14.

In an embodiment of this disclosure, after the memory 705 loads the program instructions, the processor 701 executes a transaction related to the foregoing function/logic module in the memory.

Optionally, the computer apparatus may further include a secondary memory 702 and an input/output interface 703. The secondary memory 702 is configured to assist the memory 705 in storing program instructions. The input/output interface 703 is configured to interact with a device outside the computer apparatus 700, to obtain data input by the external device or output data to the external device.

In addition, FIG. 15 shows merely an example of the computer apparatus 700. The computer apparatus 700 may include more or fewer components than those shown in FIG. 15, or may have different component configurations. In addition, various components shown in FIG. 15 may be implemented by hardware, software, or a combination of hardware and software. For example, the memory and the processor may be implemented in one module. Instructions in the memory may be written into the memory in advance, or may be loaded in a subsequent execution process of the processor.

Embodiments of this disclosure provide a computer storage medium. The storage medium stores a computer program, and the computer program is used to perform the data read/write method for a database provided in this disclosure.

Embodiments of this disclosure provide a computer program product including instructions. When the computer program product is run on a computer apparatus, the computer apparatus is enabled to perform any data read/write method provided in embodiments of this disclosure.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedure or functions according to embodiments of this disclosure are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this disclosure, the terms "first", "second", and the like are merely intended for description, and shall not be understood as an indication or implication of relative importance. The term "at least one" means one or more, and the term "a plurality of" means two or more, unless expressly limited otherwise.

Different types of embodiments such as the method embodiments and the apparatus embodiments provided in embodiments of this disclosure may be mutually referred to. This is not limited in embodiments of this disclosure. A sequence of operations in the method embodiments provided in embodiments of this disclosure can be properly adjusted, and operations can be added or deleted based on a situation. Any variation method readily figured out by a person skilled in the art within the technical scope disclosed in this disclosure shall fall within the protection scope of this disclosure. Therefore, details are not described again.

In corresponding embodiments provided in this disclosure, it should be understood that the disclosed apparatus and the like may be implemented in other composition manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network devices (for example, terminal devices). Some or all of the units may be selected based on actual requirements to achieve the objectives of the solutions of embodiments.

The foregoing descriptions are merely specific implementations of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A data read/write method for a database implemented by a computer apparatus, wherein the data read/write method comprises:

creating a first tablespace carrying a first identifier indicating a first node;
establishing a first connection to a client, wherein the first connection comprises the first identifier;
receiving a first read/write request from the client using the first connection;
determining the first tablespace corresponding to the first connection;
determining, from a plurality of second nodes and the first identifier, the first node corresponding to the first connection or the first tablespace, wherein the computer apparatus comprises the second nodes, and wherein each of the second nodes comprises a first processor and a first memory, wherein the first connection carries the first identifier after determining the first node;
loading data in the first tablespace to the first memory in the first node;
processing the first read/write request using a first working thread that is generated by the first processor in the first node;
processing, by a second working thread in a first thread pool of the computer apparatus, a second read/write request on a second connection carrying the first identifier; and
processing, by a third working thread in a second thread pool of the computer apparatus, a third read/write request on a third connection that does not carry the first identifier.

2. The data read/write method of claim 1, further comprising:

responding to the first read/write request using an initial working thread that is configured to run on one of the second nodes; and
determining a second tablespace accessed for responding to the first read/write request using the initial working thread,
wherein determining the first tablespace further comprises determining, based on the second tablespace, the first tablespace.

3. The data read/write method of claim 2, further comprising determining, as the first tablespace, a third tablespace that is first to be accessed in a process of responding to the first read/write request using the initial working thread.

4. The data read/write method of claim 3, further comprising migrating, when a quantity of working threads accessing the first tablespace in a first duration is greater than a second quantity threshold, at least a part of data in the first tablespace to the third tablespace.

5. The data read/write method of claim 2, wherein before processing the first read/write request, the data read/write method further comprises:

determining that the initial working thread is located in a third node in the second nodes other than the first node; and
migrating the initial working thread to the first node as the first working thread.

6. The data read/write method of claim 1, further comprising further determining, based on a feature of the first connection, the first node, wherein the feature comprises an Internet Protocol (IP) address of the client, a first name of a user using the client, or a second name of an application corresponding to the first connection.

7. The data read/write method of claim 1, wherein the first tablespace corresponds to a service, and wherein the first tablespace is configured to store only data of the corresponding service.

8. A computer apparatus comprising:
an interface;
a plurality of second nodes coupled to the interface and comprising a first node, wherein the first node comprises a memory and a second processor;
a first processor coupled to the interface and the second nodes and configured to:
create a first tablespace carrying a first identifier, and wherein the first identifier indicates the first node;
establish a first connection to a client;
enable the first connection to carry the first identifier;
receive a first read/write request from the client using the first connection;
determine the first tablespace corresponding to the first connection;
determine the first node corresponding to the first connection or the first tablespace;
load data in the first tablespace to the memory; and
process the first read/write request using a first working thread that is generated by the second processor;
a first thread pool, wherein a second working thread in the first thread pool is configured to process a second read/write request on a second connection carrying the first identifier; and
a second thread pool, wherein a third working thread in the second thread pool is configured to process a third read/write request on a third connection that does not carry the first identifier, and
wherein the first processor is further configured to enable the first connection to carry the first identifier.

9. The computer apparatus of claim 8, wherein the first processor is further configured to:
respond to the first read/write request using an initial working thread that is configured to run on one of the second nodes;
determine a second tablespace accessed for responding to the first read/write request using the initial working thread; and
further determine, based on the second tablespace, the first tablespace.

10. The computer apparatus of claim 9, wherein the first processor is further configured to determine, as the first tablespace, a third tablespace that is a first to be accessed in a process of responding to the first read/write request using the initial working thread.

11. The computer apparatus of claim 10, wherein the first processor is further configured to migrate, when a quantity of working threads accessing the first tablespace in a first duration is greater than a second quantity threshold, at least a part of data in the first tablespace to the third tablespace.

12. The computer apparatus of claim 9, wherein before processing the first read/write request using the first working thread, the first processor is further configured to:
determine that the initial working thread is located in a third node in the second nodes other than the first node; and
migrate the initial working thread to the first node as the first working thread.

13. The computer apparatus of claim 8, wherein the first processor is further configured to further determine, based on a feature of the first connection, the first node, and wherein the feature comprises an Internet Protocol (IP) address of the client, a first name of a user using the client, or a second name of an application corresponding to the first connection.

14. The computer apparatus of claim 8, wherein the first tablespace corresponds to a service, and wherein the first tablespace is configured to store only data of the corresponding service.

15. A computer program product comprising computer-executable instructions that are stored on a non-transitory computer-readable medium and that, when executed by a processor, cause a computer apparatus to:
create a first tablespace carrying a first identifier before establishing a first connection, wherein the first identifier indicates a first node;
establish the first connection to a client;
enable the first connection to carry the first identifier after determining the first node;
receive a first read/write request from the client using the first connection;
determine the first tablespace corresponding to the first connection;
determine, from a plurality of second nodes and based on the first identifier, the first node corresponding to the first connection or the first tablespace, wherein the computer apparatus comprises the second nodes, and wherein each of the second nodes comprises a first processor and a first memory;
load data in the first tablespace to a second memory in the first node; and
process the first read/write request using a first working thread that is generated by a second processor in the first node,
wherein the computer apparatus further comprises a first thread pool and a second thread pool,
wherein a second working thread in the first thread pool is configured to process a second read/write request on a second connection carrying the first identifier, and
wherein a third working thread in the second thread pool is configured to process a third read/write request on a third connection that does not carry the first identifier.

16. The computer program product of claim 15, wherein the computer-executable instructions further cause the computer apparatus to:
respond to the first read/write request using an initial working thread that is configured to run on one of the second nodes;
determine a second tablespace accessed for responding to the first read/write request using the initial working thread; and
further determine, based on the second tablespace, the first tablespace.

17. The computer program product of claim 16, wherein the computer-executable instructions further cause the computer apparatus to determine, as the first tablespace, a third tablespace that is a first to be accessed in a process of responding to the first read/write request using the initial working thread.

18. The computer program product of claim 17, wherein the computer-executable instructions further cause the computer apparatus to migrate, when a quantity of working threads accessing the first tablespace in a first duration is greater than a second quantity threshold, at least a part of data in the first tablespace to the third tablespace.

19. The computer program product of claim 16, wherein before processing the first read/write request, the computer-executable instructions further cause the computer apparatus to:
determine that the initial working thread is located in a third node in the second nodes other than the first node; and migrate the initial working thread to the first node as the first working thread.

20. The computer program product of claim 15, wherein the computer-executable instructions further cause the computer apparatus to further determine, based on a feature of the first connection, the first node, wherein the feature comprises an Internet Protocol (IP) address of the client, a first name of a user using the client, or a second name of an application corresponding to the first connection.

* * * * *